US012498769B2

(12) United States Patent
Cheng et al.

(10) Patent No.: US 12,498,769 B2
(45) Date of Patent: Dec. 16, 2025

(54) FOLDING MECHANISM, SUPPORT STRUCTURE AND ELECTRONIC DEVICE

(71) Applicant: VIVO MOBILE COMMUNICATION CO., LTD., Guangdong (CN)

(72) Inventors: Dongcun Cheng, Guangdong (CN); Xiaofei Jia, Guangdong (CN); Fei Dong, Guangdong (CN); Shanwen Hou, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 303 days.

(21) Appl. No.: 18/469,436

(22) Filed: Sep. 18, 2023

(65) Prior Publication Data
US 2024/0007554 A1 Jan. 4, 2024

Related U.S. Application Data (63) Continuation of application No. PCT/CN2022/080908, filed on Mar. 15, 2022.

(30) Foreign Application Priority Data

Mar. 19, 2021 (CN) .......................... 202110297141.4

(51) Int. Cl.
*G06F 1/16* (2006.01)
(52) U.S. Cl.
CPC .................. *G06F 1/1681* (2013.01)
(58) Field of Classification Search
CPC ... H04M 1/022; H04M 1/0269; G06F 1/1652; G06F 1/1681
See application file for complete search history.

(56) References Cited

U.S. PATENT DOCUMENTS 11,467,633 B2 * 10/2022 Liao ...................... G06F 1/1641
11,917,780 B2 * 2/2024 Caplow-Munro ... H05K 5/0226
(Continued)

FOREIGN PATENT DOCUMENTS

CN 110784570 A 2/2020
CN 111322307 A 6/2020
(Continued)

OTHER PUBLICATIONS

Extended European Search Report for Application No. 22770494.7, dated Jul. 29, 2024, 9 Pages.
(Continued)

*Primary Examiner* — Lewis G West
(74) *Attorney, Agent, or Firm* — BROOKS KUSHMAN P.C.

(57) ABSTRACT

A folding mechanism, a support structure and an electronic device are provided. The folding mechanism includes a first screen supporting plate, a second screen supporting plate, a first housing seat provided on the first screen supporting plate, a second housing seat provided on the second screen supporting plate, a base and a synchronization assembly. Both the first housing seat and the second housing seat are rotatably connected to the base. In the synchronization assembly, along a rotation direction, a first synchronization swing arm is in limiting fit with a first connecting shaft, and a second synchronization swing arm is in limiting fit with a second connecting shaft.

20 Claims, 5 Drawing Sheets

(56) References Cited

U.S. PATENT DOCUMENTS

| | | | |
|---|---|---|---|
| 12,351,301 B1* | 7/2025 | Shaanan | B64U 30/21 |
| 12,399,534 B2* | 8/2025 | Zhao | G06F 1/1652 |
| 2015/0260230 A1 | 9/2015 | Xu | |
| 2019/0194990 A1 | 6/2019 | Yoo et al. | |
| 2019/0278338 A1* | 9/2019 | Siddiqui | G06F 1/1656 |
| 2020/0103935 A1 | 4/2020 | Hsu | |
| 2020/0267859 A1 | 8/2020 | Kim et al. | |
| 2020/0409427 A1 | 12/2020 | Hsu | |
| 2020/0413557 A1 | 12/2020 | Zhang | |
| 2021/0271294 A1 | 9/2021 | Liao et al. | |
| 2021/0368032 A1* | 11/2021 | Liao | G06F 1/1681 |
| 2022/0104370 A1* | 3/2022 | Wu | G06F 1/1681 |
| 2022/0116489 A1* | 4/2022 | Nagai | G06F 1/1652 |
| 2022/0217228 A1 | 7/2022 | Hu et al. | |
| 2022/0303371 A1* | 9/2022 | Liao | H04M 1/0216 |
| 2023/0075646 A1 | 3/2023 | Niu et al. | |
| 2023/0164253 A1* | 5/2023 | Xu | G06F 1/1641 |
| | | | 455/566 |
| 2024/0004430 A1* | 1/2024 | Zhao | F16C 11/04 |
| 2024/0094785 A1* | 3/2024 | Cheng | H04M 1/022 |
| 2024/0206093 A1* | 6/2024 | Liao | H05K 5/0226 |
| 2024/0427388 A1* | 12/2024 | Shen | G06F 1/1616 |
| 2025/0147558 A1* | 5/2025 | Liao | G06F 1/1616 |
| 2025/0258522 A1* | 8/2025 | Zhang | G06F 1/1652 |

FOREIGN PATENT DOCUMENTS

| | | |
|---|---|---|
| CN | 111405095 A | 7/2020 |
| CN | 111614806 A | 9/2020 |
| CN | 111692196 A | 9/2020 |
| CN | 111770223 A | 10/2020 |
| CN | 111833729 A | 10/2020 |
| CN | 211699557 U | 10/2020 |
| CN | 112081815 A | 12/2020 |
| CN | 113067924 A | 7/2021 |
| KR | 20190076680 A | 7/2019 |
| KR | 20200101239 A | 8/2020 |
| WO | 2020186889 A1 | 9/2020 |
| WO | 2020210987 A1 | 10/2020 |

OTHER PUBLICATIONS

First Office Action for Korean Application No. 10-2023-7030920, dated Oct. 14, 2024, 6 Pages.

First Office Action for Chinese Application No. 202110297141.4, dated Dec. 2, 2022, 6 Pages.

International Search Report and Written Opinion for Application No. PCT/CN2022/080908, dated May 27, 2022, 7 Pages.

* cited by examiner

FOLDING MECHANISM, SUPPORT STRUCTURE AND ELECTRONIC DEVICE

CROSS-REFERENCE TO RELATED APPLICATIONS

This application is a continuation of PCT International Application No. PCT/CN2022/080908 filed on Mar. 15, 2022, which claims priority to Chinese Patent Application No. 202110297141.4, which are incorporated herein by reference in their entireties.

TECHNICAL FIELD

This application belongs to the technical field of communication devices, and in particular relates to a folding mechanism, a support structure and an electronic device.

BACKGROUND

With the advancement of technology, the patterns of electronic devices such as mobile phones are becoming increasingly diverse, including, for example, flat panel type, sliding cover type and foldable type. Among them, foldable electronic devices are increasingly favored by consumers due to their advantages such as large display area and strong portability. However, the synchronism of left and right housings of current foldable electronic devices is relatively poor, and the electronic devices are prone to damage.

SUMMARY

This application discloses a folding mechanism, a support structure and an electronic device.

The embodiments of this application are implemented as follows:

In a first aspect, an embodiment of this application provides a folding mechanism, including a first screen supporting plate, a second screen supporting plate, a first housing seat, a second housing seat, a base and a synchronization assembly.

The first housing seat being provided on the first screen supporting plate, and the second housing seat being provided on the second screen supporting plate;

the base being provided with a plurality of first rotating parts, both the first housing seat and the second housing seat being correspondingly and rotatably connected to the plurality of first rotating parts one to one through respective second rotating parts, and the folding mechanism having an unfolded state and a folded state; and the synchronization assembly including a first connecting shaft, a second connecting shaft, a first synchronization swing arm, a second synchronization swing arm and a synchronization connector, the first synchronization swing arm being in limiting fit with the first connecting shaft in a rotation direction of the second rotating part, and the first synchronization swing arm being in fit with the first housing seat;

the second synchronization swing arm being in limiting fit with the second connecting shaft in a rotation direction of the second rotating part, and the second synchronization swing arm being in fit with the second housing seat; and the first synchronization swing arm being provided with a first sliding groove extending spirally, the second synchronization swing arm being provided with a second sliding groove extending spirally, the synchronization connector being provided with a first sliding block and a second sliding block, the first sliding block being in sliding fit with the first sliding groove, the second sliding block being in fit with the second sliding groove, and the first housing seat and the second housing seat synchronously rotating through the synchronization assembly.

In a second aspect, an embodiment of this application provides a support structure, including a first housing, a second housing and the support structure, the first housing seat being fixedly connected to the first housing, and the second housing seat being fixedly connected to the second housing.

In a third aspect, an embodiment of this application provides an electronic device, including a first display module and the folding mechanism described in the first aspect, the first display module including a flexible display screen, the first display module being mounted on the support structure, and the first display module being supported on the first housing, the second housing, the first screen supporting plate and the second screen supporting plate.

An embodiment of this application provides a folding mechanism, including a first screen supporting plate, a second screen supporting plate, a first housing seat, a second housing seat, a base and a synchronization assembly. The first screen supporting plate is provided on the first housing seat. The second screen supporting plate is provided on the second housing seat. Both the first housing seat and the second housing seat are rotatably connected to the base. The first screen supporting plate and the second screen supporting plate can rotate relative to the first housing seat and the second housing seat, thus enabling the folding mechanism to switch between a folded state and an unfolded state.

Moreover, a synchronization assembly is provided in the folding mechanism. The synchronization assembly includes a first connecting shaft, a second connecting shaft, a first synchronization swing arm, a second synchronization swing arm and a synchronization connector. With the help of spiral sliding grooves and sliding blocks, the synchronization connector is connected to the first synchronization swing arm and the second synchronization swing arm at the same time, so that while one of the first synchronization swing arm and the second synchronization swing arm rotates with the first housing seat or the second housing seat, the other of the first synchronization swing arm and the second synchronization swing arm can rotate simultaneously, thus enabling the first screen supporting plate and the second screen supporting plate to rotate at the same angle.

BRIEF DESCRIPTION OF THE DRAWINGS

The accompanying drawings described herein are used to provide a further understanding of this application, and form part of this application. Exemplary embodiments of this application and descriptions thereof are used to explain this application, and do not constitute any inappropriate limitation to this application. In the accompanying drawings.

DESCRIPTIONS OF REFERENCE SIGNS

110—first housing, 120—second housing,
201—first surface, 202—second surface, 203—first side, 210—first screen supporting plate, 220—second screen supporting plate, 230—third screen supporting plate,
302—second rotating part, 303—avoiding groove, 310—first housing seat, 320—second housing seat,
410—base, 411—accommodating groove, 412—first rotating part, 420—cover body,
510—third rotating part, 520—fourth rotating part,
610—flexible display screen,
710—limiting seat, 711—limiting hole, 712—fitting hole, 720—elastic member, 731—first cam sleeve, 731a—first sliding groove, 732—second cam sleeve, 733—third cam sleeve, 733a—second sliding groove, 741—first synchronization swing arm, 742—second synchronization swing arm, 751—first connecting shaft, 752—second connecting shaft, 760—columnar structure, 761—first sliding block, 762—second sliding block, and 770—circlip.

DETAILED DESCRIPTION

To state the objectives, technical solutions, and advantages of this application more clear, the technical solutions of this application will be clearly and completely described below with reference to specific embodiments of this application and the corresponding accompanying drawings. Apparently, the described embodiments are only some embodiments rather than all the embodiments of this application. All other embodiments obtained by an ordinary person skilled in the art based on the embodiments of this application shall fall within the scope of the protection of this application.

The following describes the technical solution disclosed in each embodiment of this application in detail by combining the accompanying drawings.

Referring to FIG. 1-9, embodiments of this application disclose a folding mechanism, a support structure and an electronic device. The electronic device may be a foldable electronic device. The electronic device may include a flexible display screen 610 and the support structure. The support structure may include a first housing 110, a second housing 120, and the folding mechanism. By adopting the folding mechanism, the electronic device can switch between the folded state and the unfolded state.

Figure 6:
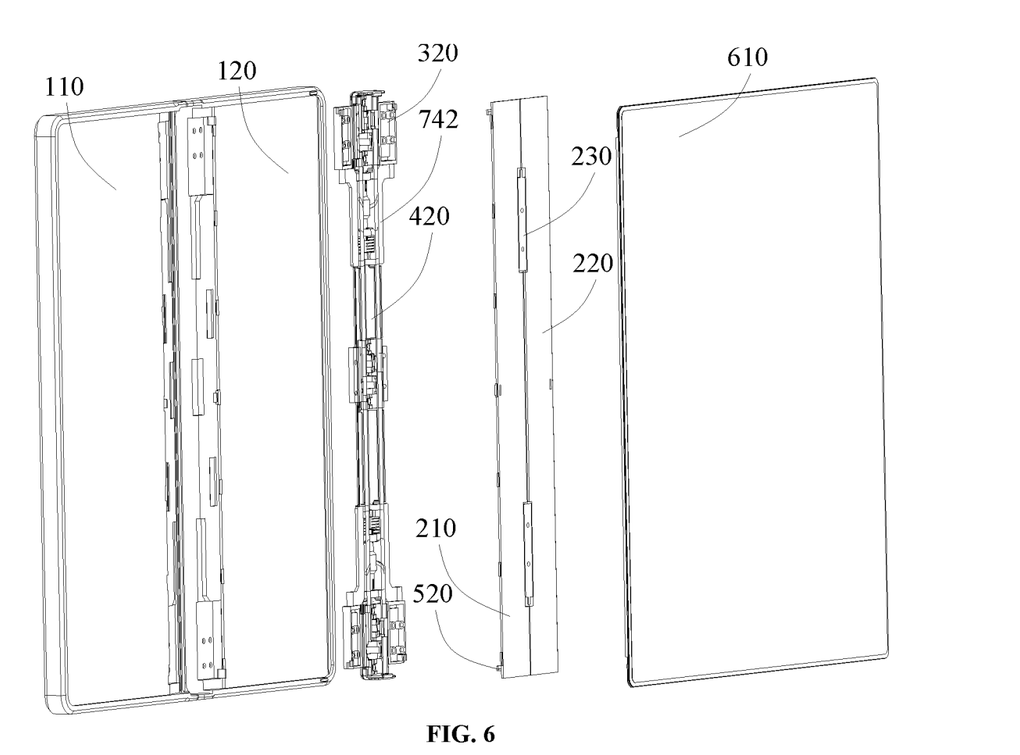
FIG. 6 illustrates an exploded schematic diagram of an electronic device according to an embodiment of this application.
Figure 7:
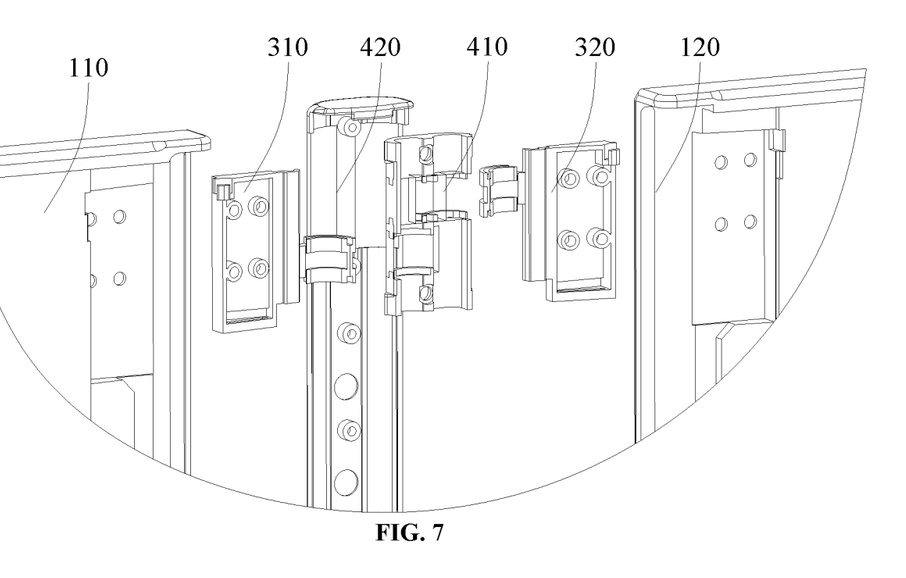
FIG. 7 illustrates an enlarged diagram of a partial structure in an electronic device according to an embodiment of this application.

Referring to FIG. 6 and FIG. 7, the folding mechanism disclosed in this embodiment of this application includes a first screen supporting plate 210, a second screen supporting plate 220, a first housing seat 310, a second housing seat 320, a base 410 and a synchronization assembly, In order to improve the symmetry of the folding mechanism and improve the folding performance of the entire folding mechanism, the structures of the first screen supporting plate 210 and the second screen supporting plate 220 may be symmetrically provided on the two opposite sides of the base 410 respectively.

Correspondingly, the structures of the first housing seat 310 and the second housing seat 320 are symmetrically provided, and a first rotating part 412 on the base 410 in fit with the first housing seat 310 and a first rotating part 412 on the base 410 in fit with the second housing seat 320 are also symmetrically provided.

The base 410 is a basic structural component of the folding mechanism. The base 410 can provide a mounting foundation for other components of the folding mechanism, thus enabling other components of the folding mechanism to be directly or indirectly mounted based on the base 410. Optionally, the base 410 is a thin plate, so as to reduce the occupied space. Specifically, the base 410 may be a metal plate. The metal plate can ensure that the base 410 still has sufficient strength at a smaller thickness without influencing the supporting performance of the base 410.

The base 410 is provided with a plurality of first rotating parts 412. Both the first housing seat 310 and the second housing seat 320 include second rotating parts 302. A plurality of second rotating parts 302 may be correspondingly in fit with the plurality of first rotating parts 412 one to one, so that both the first housing seat 310 and the second housing seat 320 can form a stable rotating fit relationship with the base 410, thus ensuring that the first housing seat 310 can be connected to the second housing seat 320 as a whole through the base 410.

Specifically, the number of the first rotating parts 412 may be two. One of the two first rotating parts 412 is in fit with the second rotating part 302 of the first housing seat 310, and the other is in fit with the second rotating part 302 of the second housing seat 320. In this case, the two second rotating parts 302 can be symmetrically provided on the base 410 to ensure good folding performance of the folding mechanism. Of course, in the case that the number of the first rotating parts 412 in fit with the first housing seat 310 is more than one, the plurality of first rotating parts 412 may be provided spaced apart from each other along the axial direction of the base 410, i.e., the direction of the rotation axis of the second rotating part 302. Correspondingly, the number of the first rotating parts 412 in fit with the second housing seat 320 may also be more than one. By adopting the technical solution, the reliability of the connection relationship and the rotating fit relationship between the first housing seat 310 and the second housing seat 320 can be further improved. The direction of the rotation axis of the second rotating part 302 may be in direction A in FIG. 4.

The first rotating part 412 and the second rotating part 302 are rotating structure members in fit with each other. For example, they may be shaft-hole fitting structures. In another embodiment of this application, one of the first rotating part 412 and the second rotating part 302 may be an arc-shaped groove structure, and the other may be an arc-shaped block structure. In this case, the stability of the rotating fit relationship between the first rotating part 412 and the second rotating part 302 can be improved to a certain extent. Moreover, the base 410 may be an arc-shaped structural member, so as to provide a better foundation for the formation of the first rotating part 412 and reduce the overall size of the base 410.

Referring to FIG. 1 to FIG. 9, the first housing seat 310 is provided on the first screen supporting plate 210, and the second housing seat 320 is provided on the second screen supporting plate 220. In a case that the folding mechanism is applied to an electronic device, both the first screen supporting plate 210 and the second screen supporting plate 220 can provide support for the flexible display screen 610. In order to prevent the presence of the first housing seat 310 and the second housing seat 320 from influencing the effect of supporting the flexible display screen 610, the first housing seat 310 is provided on the side of the first screen supporting plate 210 away from the flexible display screen 610, and correspondingly, the second housing seat 320 is provided on the side of the second screen supporting plate 220 away from the flexible display screen 610. Optionally, a fixed connection relationship may be formed between the first housing seat 310 and the first screen supporting plate 210, and between the second housing seat 320 and the second screen supporting plate 220, so that the first housing seat 310 and the second housing seat 320 can respectively drive the first screen supporting plate 210 and the second screen supporting plate 220 to rotate relative to the base 410.

The folding mechanism has an unfolded state and a folded state. By moving the first housing seat 310 and the second housing seat 320 relative to the base 410, the entire folding mechanism can switch between the folded state and the unfolded state. Moreover, in the state switching process of the folding mechanism, both the first screen supporting plate 210 and the second screen supporting plate 220 will move relative to the base 410.

Figure 2:
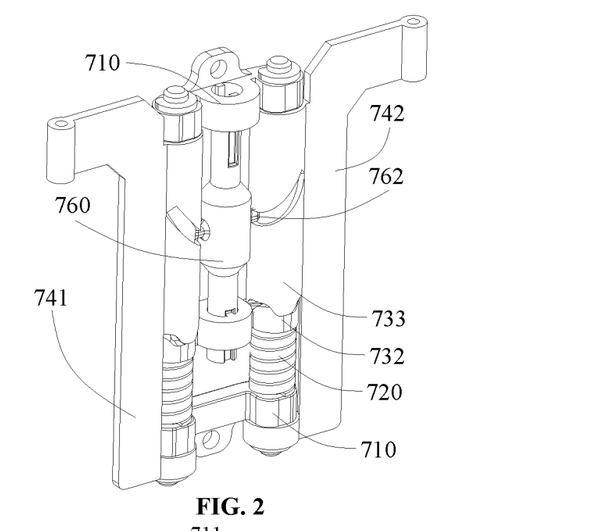
FIG. 2 illustrates a schematic diagram of a structure including a synchronization assembly in a support structure according to an embodiment of this application.
Figure 3:
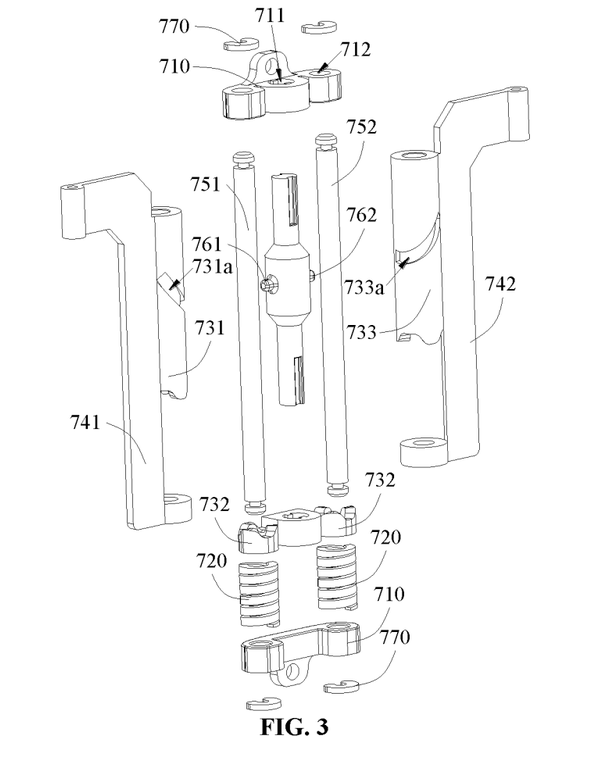
FIG. 3 illustrates an exploded schematic diagram of the structure illustrated in FIG. 2.

Referring to FIG. 2 and FIG. 3, the synchronization assembly includes a first connecting shaft 751, a second connecting shaft 752, a first synchronization swing arm 741, a second synchronization swing arm 742, and a synchronization connector. The first synchronization swing arm 741 is in limiting fit with the first connecting shaft 751 in the rotation direction of the second rotating part 302, and the second synchronization swing arm 742 is in limiting fit with the second connecting shaft 752 in the rotation direction of the second rotating part 302.

Specifically, both the first connecting shaft 751 and the second connecting shaft 752 may be rotatably connected to the base 410, the first synchronization swing arm 741 may be provided on the first connecting shaft 751 in a sleeving manner, the second synchronization swing arm 742 may be provided on the second connecting shaft 752 in a sleeving manner, and both the two sets of components can be enabled to form an interference fit relationship. In another embodiment of this application, a limiting fit relationship can be formed between the first synchronization swing arm 741 and the first connecting shaft 751 through key connection, and correspondingly, a limiting fit relationship can be formed between the second synchronization swing arm 742 and the second connecting shaft 752 through key connection, thus further improving the stability of the limiting fit relationship mentioned above.

At the same time, the first synchronization swing arm 741 is in fit with the first housing seat 310, and the second synchronization swing arm 742 is in fit with the second housing seat 320. Specifically, the fit relationship between the first synchronization swing arm 741 and the first housing seat 310 may be determined based on actual parameters such as the direction of the rotation axis of the first connecting shaft 751 and the second rotating part 302. For example, in a case that the axial direction of the first connecting shaft 751 coincides with the direction of the rotation axis of the second rotating part 302 of the first housing seat 310, the first synchronization swing arm 741 and the first housing seat 310 may be fixed relative to each other. In another embodiment of this application, the direction of the rotation axis of the first connecting shaft 751 may be enabled to be not coincide with the direction of the rotation axis of the second rotating part 302. In this case, it is required to enable the first synchronization swing arm 741 and the first housing seat 310 to be movable relative to each other.

Figure 4:
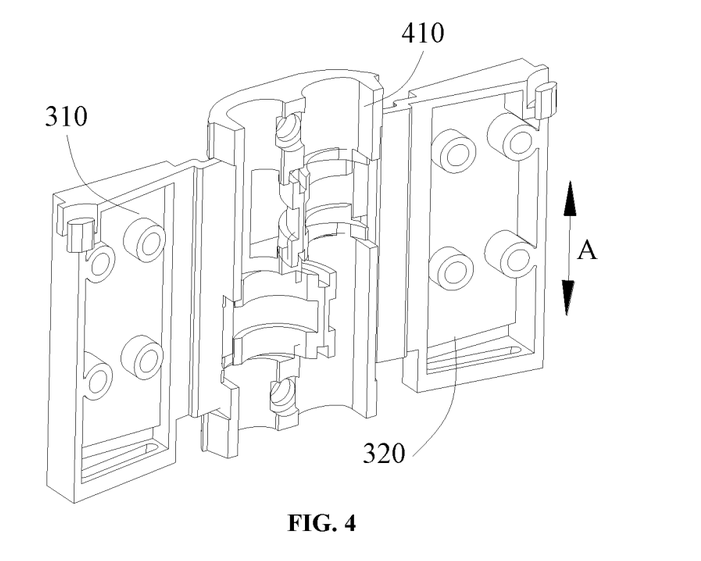
FIG. 4 illustrates a schematic diagram of a partial structure including a base in a support structure according to an embodiment of this application.

Specifically, referring to FIG. 2 and FIG. 4, a sliding groove may be provided on one of the first synchronization swing arm 741 and the first housing seat 310, a sliding rod may be provided on the other, and the sliding rod may be in fit with the sliding groove. In this case, even if the direction of the rotation axis of the first connecting shaft 751 does not coincide with the direction of the rotation axis of the second rotating part 302, it can be ensured that the first housing seat 310 can drive the first synchronization swing arm 741 to rotate relative to the base 410.

The first synchronization swing arm 741 is provided with a first sliding groove 731*a* extending spirally, the second synchronization swing arm 742 is provided with a second sliding groove 733*a* extending spirally, the synchronization connector is provided with a first sliding block 761 and a second sliding block 762, the first sliding block 761 is in fit with the first sliding groove 731*a*, and the second sliding block 762 is in fit with the second sliding groove 733*a*, so that the first housing seat 310 and the second housing seat 320 can rotate synchronously through the synchronization assembly.

In a case that the above technical solution is adopted, it can be ensured that the first screen supporting plate 210 and the second screen supporting plate 220 have the ability to rotate synchronously. Therefore, regardless of which of the two is driven, the synchronization assembly can drive the other to rotate relative to the base 410, so that the rotation angles of the first screen supporting plate 210 and the second screen supporting plate 220 relative to the base 410 are always the same, thus improving the comprehensive performance of the entire folding mechanism.

Specifically, the first sliding block 761 and the second sliding block 762 of the synchronization connector may be connected together to a columnar structure 760, and the synchronization connector may be formed by integrated molding, so as to improve the stability of the fixed relationship between the first sliding block 761 and the second sliding block 762. The first sliding groove 731*a* and the second sliding groove 733*a* may be spiral grooves corresponding to each other, so as to ensure that the sliding fit relationship between the first sliding block 761 and the first sliding groove 731*a* and between the second sliding block 762 and the second sliding groove 733*a* are stable and synchronized in the process of relative rotation of the first synchronization swing arm 741 and the second synchronization swing arm 742. Of course, the specific shapes of the first sliding groove 731*a* and the second sliding groove 733*a* may be determined according to the specific shapes of the structures in which they are located, which will not be limited here.

An embodiment of this application provides a folding mechanism, which includes a first screen supporting plate 210, a second screen supporting plate 220, a first housing seat 310, a second housing seat 320, a base 410 and a synchronization assembly. The first screen supporting plate 210 is provided on the first housing seat 310. The second screen supporting plate 220 is provided on the second housing seat 320. Both the first housing seat 310 and the second housing seat 320 are rotatably connected to the base 410. The first screen supporting plate 210 and the second screen supporting plate 220 can rotate relative to the first housing seat 310 and the second housing seat 320, thus enabling the folding mechanism to switch between a folded state and an unfolded state.

Moreover, a synchronization assembly is provided in the folding mechanism. The synchronization assembly includes a first connecting shaft 751, a second connecting shaft 752, a first synchronization swing arm 741, a second synchronization swing arm 742 and a synchronization connector. With the help of spiral sliding grooves and sliding blocks, the synchronization connector is connected to the first synchronization swing arm 741 and the second synchronization swing arm 742 at the same time, so that while one of the first synchronization swing arm 741 and the second synchronization swing arm 742 rotates with the first housing seat 310 or the second housing seat 320, the other of the first synchronization swing arm 741 and the second synchronization swing arm 742 can rotate simultaneously, thus enabling the first screen supporting plate 210 and the second screen supporting plate 220 to rotate at the same angle, improving the synchronism of the folding mechanism, and improving the service life of the folding mechanism and the electronic device using the folding mechanism.

Further, in the folding mechanism provided in this embodiment of this application, the synchronization assembly may further include a limiting seat 710, the limiting seat 710 is fixedly connected to the base 410, the limiting seat 710 is provided with a limiting hole 711, one end of the synchronization connector extends into the limiting hole 711, and the synchronization connector is in limiting fit with the limiting seat 710 in the rotation direction of the second rotating part 302. Specifically, the limiting seat 710 may be fixed to the base 410 through bonding or the like, or the limiting seat 710 may be detachably fixed to the base 410 through a threaded connector or the like, thus improving the assembling efficiency and connection reliability between the two, and facilitating subsequent disassembling and maintenance. As described above, both the first sliding block 761 and the second sliding block 762 may be fixed to a columnar structure 760. Optionally, one end of the columnar structure 760 may extend into the limiting hole 711, so that the limiting seat 710 is in limiting fit with the synchronization connector in the rotation direction of the second rotating part 302, thus preventing the synchronization connector from rotating relative to the base 410 in the process of rotation of the first synchronization swing arm 741 and/or the second synchronization swing arm 742 relative to the base 410, and improving the synchronization reliability between the first synchronization swing arm 741 and the second synchronization swing arm 742.

In addition, the limiting hole 711 may be a non-circular hole and the synchronization connector may correspond to the shape of the limiting hole 711, so that a limiting relationship can be formed between the two in the rotation direction of the second rotating part 302. Alternatively, a groove may be provided at one end of the synchronization connector, and a convex block may be provided in the limiting hole 711. By enabling the convex block to be in fit with the groove, the synchronization connector and the limiting hole 711 can also form a limiting relationship in the rotation direction of the second rotating part 302. It is to be understood that, regardless of whether the limiting seat 710 is provided or not, it is required to ensure that the first synchronization swing arm 741 and the second synchronization swing arm 742 can move relative to the synchronization connector along the direction of the rotation axis of the second rotating part 302, so as to ensure the normal operation of the synchronization assembly.

As described above, the first connecting shaft 751 and the second connecting shaft 752 may be rotatably mounted on the base 410. Based on the above embodiment, in a case that the synchronization assembly is provided with the limiting seat 710, further, two opposite ends of the synchronization connector may be provided with the limiting seats 710, each limiting seat 710 is provided with two fitting holes 712, one ends of the first connecting shaft 751 and the second connecting shaft 752 are correspondingly in insertion fit with the two fitting holes 712 of one limiting seat 710, and the first connecting shaft 751 and the second connecting shaft 752 are in limiting fit with the two limiting seats 710 in the direction of the rotation axis of the second rotating part 302. In a case that the above technical solution is adopted, the difficulty in mounting the first connecting shaft 751 and the second connecting shaft 752 can be reduced, and the rotation stability of the two can be improved.

Specifically, the two limiting seats 710 may be fixed to the base 410 through a threaded connector, a certain space may be provided between the two limiting seats 710, and the space may be used for mounting the synchronization connector. The fitting holes may be blind holes. Both the first connecting shaft 751 and the second connecting shaft 752 may be mounted into the two opposite fitting holes 712, so as to achieve the purpose of being in rotating fit with the limiting seat 710. In another embodiment of this application, the fitting holes 712 may be run-through holes, and respective two opposite ends of the first connecting shaft 751 and the second connecting shaft 752 may be extended beyond the two limiting seats 710. Afterwards, the first connecting shaft 751 and the second connecting shaft 752 can be limited with the help of circlips 770, so that the first connecting shaft 751 and the second connecting shaft 752 can also form a stable limiting fit relationship with the two limiting seats 710.

Optionally, in the folding mechanism provided in this embodiment of this application, the first synchronization swing arm 741 may be further provided with a first cam sleeve 731, the first cam sleeve 731 is provided with a first sliding groove 731a, the folding mechanism further includes a second cam sleeve 732 and an elastic member 720, and the first cam sleeve 731 and the second cam sleeve 732 are provided on the first connecting shaft 751 in a sleeving manner. The second cam sleeve 732 is in rotating fit with the first connecting shaft 751 in the rotation direction of the second rotating part 302. In a case that the first cam sleeve 731 and the second cam sleeve 732 rotate relative to each other, and the elastic member 720 is in a stretched state or a compressed state.

Specifically, the specific structures of the first cam sleeve 731 and the second cam sleeve 732 may be the same or similar, which are provided in a fastening manner. In the process of relative rotation of the first cam sleeve 731 and the second cam sleeve 732, the maximum spacing between the first cam sleeve 731 and the second cam sleeve 732 will be greater than the initial spacing (i.e., the minimum spacing) between the two. In this case, the elastic member 720 will be stretched or compressed, so that the elastic member 720 can apply an elastic resetting force to the first cam sleeve 731 and/or the second cam sleeve 732, thus promoting the first cam sleeve 731 and the second cam sleeve 732 to return to a fastened state, i.e., the state with the smallest spacing between the two.

By adopting the above technical solution, the relative position between the first cam sleeve 731 and the second cam sleeve 732 in the fastened state can be designed, so that when the folding mechanism is in the folded state and the unfolded state, both the first cam sleeve 731 and the second cam sleeve 732 are in the fastened state. Therefore, as long as the folding mechanism is no longer in the folded state or the unfolded state, the spacing between the first cam sleeve 731 and the second cam sleeve 732 will increase due to relative rotation, enabling the elastic member 720 to be stretched or compressed. Therefore, in a case that the above technical solution is adopted, the elastic member 720 can be used to easily maintain the unfolded state and the folded state of the folding mechanism, and can prevent small external forces from destroying the unfolded state or the folded state of the folding mechanism, which may cause inconvenience to users.

Further, the folding mechanism further includes two limiting seats 710 opposite and fixed along the direction of the rotation axis of the second rotating part 302, the first cam sleeve 731, the second cam sleeve 732 and the elastic member 720 are all provided between the two limiting seats 710, and the elastic member 720 is provided on the side of the second cam sleeve 732 away from the first cam sleeve 731. In a case that the above technical solution is adopted, the two limiting seats 710 can provide a positioning foundation, thus improving the reliability of the elastic member 720 on the one hand and reducing the difficulty in mounting the elastic member 720 on the other hand.

In a case that the above technical solution is adopted, the first cam sleeve 731 and the second cam sleeve 732 rotate relative to each other, so that the elastic member 720 is compressed, causing the elastic member 720 to apply an elastic force to the first cam sleeve 731 and the second cam sleeve 732 to reset. In order to further prevent the problem that it is difficult for the folding mechanism to maintain the folded state and the unfolded state, the elastic member 720 may be made to have a pre-tightening force, that is, when the first cam sleeve 731 and the second cam sleeve 732 are fastened to each other, the elastic member 720 may be kept in the compressed state.

Specifically, the first cam sleeve 731 and the first synchronization swing arm 741 may be formed by welding or integrated molding, and the first synchronization swing arm 741 and the first connecting shaft 751 may form a limiting fit relationship in the rotation direction of the second rotating part 302 through the first cam sleeve 731. More specifically, the first cam sleeve 731 and the first connecting shaft 751 may be connected to each other through key connection. The inner circumferential surface of the second cam sleeve 732 may be a circular structural member, so as to that the second cam sleeve 732 can rotate normally relative to the first connecting shaft 751. Of course, in order to prevent the second cam sleeve 732 and the first cam sleeve 731 from rotating with the first connecting shaft 751 while the first connecting shaft 751 rotates with the first synchronization swing arm 741, optionally, the second cam sleeve 732 is in limiting fit with the base 410 in the rotation direction of the second rotating part 302.

In a case that the first synchronization swing arm 741 is provided with the first cam sleeve 731, a third cam sleeve 733 may be provided on the second synchronization swing arm 742, the third cam sleeve 733 is provided with a second sliding groove 733a, and each of the first cam sleeve 731 and the third cam sleeve 733 is correspondingly provided with a second cam sleeve 732 and an elastic member 720. Specifically, the shape and structure of the third cam sleeve 733 may correspond to the shape and structure of the first cam sleeve 731. In this case, the shape and structure of each second cam sleeve 732 may be correspondingly the same, so as to reduce the difficulty in fabricating and assembling the parts.

By adopting the above technical solution, in a case that the folding mechanism is in the unfolded state and the folded state, both the side where the first synchronization swing arm 741 is located and the side where the second synchronization swing arm 742 is located may be subjected to the elastic force of the elastic member 720. This elastic force can prevent the folding mechanism from being out of the unfolded state and the folded state, thus improving the ability of the folding mechanism to stably maintain the unfolded state and the folded state. Of course, both the first synchronization swing arm 741 and the second synchronization swing arm 742 may be provided with a plurality of sets of first cam sleeves 731, third cam sleeves 733 and elastic members 720 which are in fit with each other, so as to further improve the ability of the folding mechanism to maintain the folded state and the unfolded state.

As described above, by making the second cam sleeve 732 and components such as the base 410 form a limiting relationship that meets the requirements, the second cam sleeve 732 can be prevented from rotating with the first cam sleeve 731 when the first cam sleeve 731 rotates, so that the first cam sleeve 731 and the second cam sleeve 732 cannot move axially. Based on the above embodiment, in a case that the first synchronization swing arm 741 and the second synchronization swing arm 742 each are provided with the first cam sleeve 731 and the third cam sleeve 733, a connector may be provided between the two second cam sleeves 732 correspondingly in fit with the first cam sleeve 731 and the third cam sleeve 733. In this case, on the one hand, the second cam sleeves 732 can be respectively mounted on the first connecting shaft 751 and the second connecting shaft 752 at the same time, so as to reduce the difficulty in assembling; on the other hand, the two second cam sleeves 732 can be enabled to have the ability to act synchronously, so as to further improve the ability of the folding mechanism to maintain the folded state and the unfolded state. In addition, by connecting the two second cam sleeves 732 through the connector, in the process of designing and assembling the second cam sleeves 732, there is no need to separately configure a limiting structure for the second cam sleeves 732. Under the joint action of the connector and the two second cam sleeves 732, the second cam sleeves 732 can rotate relative to the first connecting shaft 751 and the second connecting shaft 752, thus basically ensuring that the second cam sleeves 732 will not rotate with the rotation of the first cam sleeve 731. In addition, a limiting hole 711 may be provided on the connector, and the synchronization connector is in fit with the limiting hole 711 in the connector, so as to limit the rotation of the synchronization connector relative to the base 410 along the rotation direction of the second rotating part 302.

Figure 8:
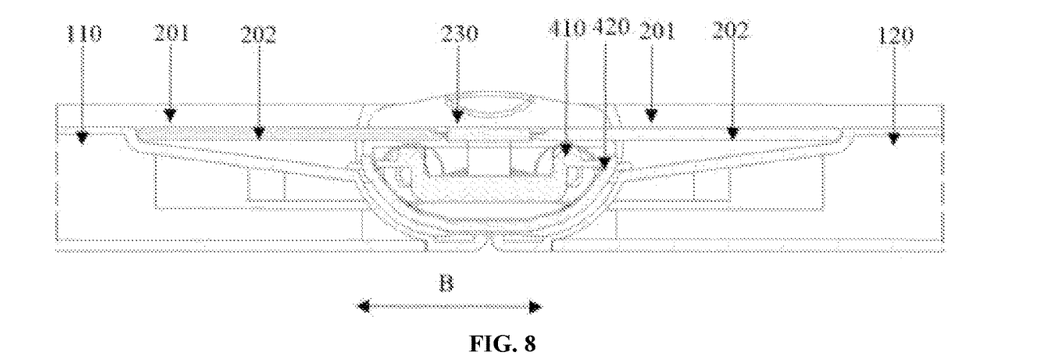
FIG. 8 illustrates a schematic diagram of an electronic device in an unfolded state according to an embodiment of this application.
Figure 9:
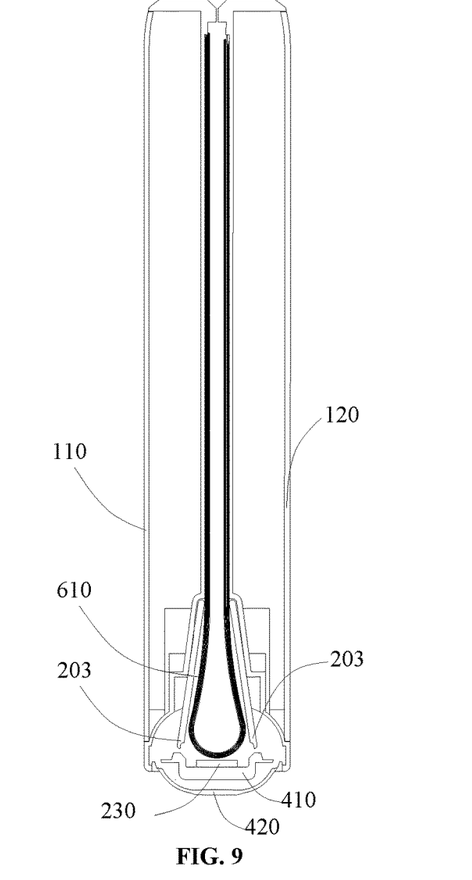
FIG. 9 illustrates a schematic diagram of an electronic device in a folded state according to an embodiment of this application.

Further, referring to FIG. 7 to FIG. 9, the first screen supporting plate 210 is in rotating fit with the first housing seat 310, and the second screen supporting plate 220 is in rotating fit with the second housing seat 320. In this case, in the process of the rotation of the first housing seat 310 and the second housing seat 320 relative to the base 410, not only can the first screen supporting plate 210 and the second screen supporting plate 220 rotate correspondingly with the rotation of the first housing seat 310 and the second housing seat 320, but also the first screen supporting plate 210 can rotate relative to the first housing seat 310, and the second screen supporting plate 220 can rotate relative to the second housing seat 320.

The first screen supporting plate 210 and the second screen supporting plate 220 each have a first side 203 and a second side provided opposite to each other. The first screen supporting plate 210 and the second screen supporting plate 220 each have a first surface 201 and a second surface 202 provided opposite to each other. The first surfaces 201 of the first screen supporting plate 210 and the second screen supporting plate 220 are provided away from the base 410, that is, the first screen supporting plate 210 and the second screen supporting plate 220 are provided on the same side of the base 410, each first surface 201 serves as a screen supporting surface to support the flexible display screen 610. In the first screen supporting plate 210 and the second screen supporting plate 220, the second surface 202 provided opposite to the first surfaces 201 is provided facing to the base 410.

Referring to FIG. 8, in combination with FIG. 9, in the unfolded state, respective first sides 203 of the first screen supporting plate 210 and the second screen supporting plate 220 are located between respective second sides, and respective first surfaces 201 of the first screen supporting plate 210 and the second screen supporting plate 220 away from the base 410 are provided in flush with each other.

Referring to FIG. 8, in the folded state, the spacing between the respective first sides 203 of the first screen supporting plate 210 and the second screen supporting plate 220 is greater than the spacing between the respective second sides of the first screen supporting plate 210 and the second screen supporting plate 220.

Specifically, in the unfolded state, the first screen supporting plate 210 and the second screen supporting plate 220 are provided in flush with each other, so that the two can provide support for the flexible display screen 610 and other devices, thus ensuring that the flexible display screen 610 can stably maintain an unfolded state. In combination with FIG. 8 and FIG. 9, in the process that the folding mechanism switches from the unfolded state to the folded state, the angle of relative rotation between the first screen supporting plate 210 and the second screen supporting plate 220 is greater than 180°, so as to ensure that the spacing between the respective first sides 203 of the first screen supporting plate 210 and the second screen supporting plate 220 in the folded state is greater than the spacing between the respective second sides.

In addition, as described above, the folding mechanism can be applied to the support structure. When the support structure is folded to the folded state with the folding mechanism, referring to FIG. 9, the first housing 110 and the second housing 120 are stacked, and the respective screen supporting surfaces of the first housing 110 and the second housing 120 are in parallel, so that the two parts supported on the first housing 110 and the second housing 120 in the flexible display screen 610 can also be in parallel with each other. In the process of assembling the first screen supporting plate 210 and the first housing seat 310, the rotatable connecting structure (such as rotating assembly mentioned below) between the first screen supporting plate 210 and the first housing seat 310 may be provided at a position close to the second side of the first screen supporting plate 210, so that when the first screen supporting plate 210 and the first housing seat 310 rotate relative to each other, the first screen supporting plate 210 can basically take its second side as an axis, thus preventing the second side of the first screen supporting plate 210 from rotating in a direction of getting away from the first housing seat 310 while the first side 203 of the first screen supporting plate 210 rotates in a direction of getting close to the first housing seat 310, and ensuring that the first screen supporting plate 210 can always provide good support effect for components such as the flexible display screen 610. Correspondingly, in the process of assembling the second screen supporting plate 220 and the second housing seat 320, a reference may be made to the above implementation.

Based on the above situation, referring to FIG. 9, the spacing between the respective second sides of the first screen supporting plate 210 and the second screen supporting plate 220 is equal to or basically equal to the spacing between the respective screen support surfaces of the first housing 110 and the second housing 120 of the support structure in the folded state. Therefore, it can also be considered that in the folded state, the spacing between the respective first sides 203 of the first screen supporting plate 210 and the second screen supporting plate 220 is greater than the spacing between the first housing 110 and the second housing 120.

More specifically, the specific value of the spacing between the respective first sides 203 of the first screen supporting plate 210 and the second screen supporting plate 220 of the folding mechanism in the folded state may be determined according to parameters such as the width of the first screen supporting plate 210 and the second screen supporting plate 220. The width is in a direction perpendicular to the direction of the rotation axis of the second rotating part 302. More specifically, it may be in direction B in FIG. 8.

It is to be understood that, in order to ensure that the angle of relative rotation between the first screen supporting plate 210 and the second screen supporting plate 220 can exceed 180°, it is required to ensure that the first screen supporting plate 210 can move relative to the first housing seat 310, and that the second screen supporting plate 220 can move relative to the second housing seat 320. More specifically, in order to achieve the above purpose, the specific structures and/or mounting positions of components such as the base 410, the first housing seat 310 and the second housing seat 320 may be limited.

Taking the first screen supporting plate 210 as an example, in the unfolded state, referring to FIG. 8, in combination with FIG. 9, it is required to ensure that the part from the rotatable connecting position between the first screen supporting plate 210 and the first housing seat 310 to the first side 203 of the first screen supporting plate 210 is spaced apart from the components such as the first housing seat 310, the base 410 and the first housing 110, so as to provide an avoiding space for the first screen supporting plate 210 to rotate in the direction of getting close to the first housing seat 310. Similarly, this is also true in the process of designing and arranging components such as the second housing seat 320, the base 410 and the second housing 120 corresponding to the second screen supporting plate 220.

In a case that the above technical solution is adopted, since in the folded state, the spacing between the respective first sides 203 of the first screen supporting plate 210 and the second screen supporting plate 220 is greater than the spacing between the respective second sides, the first screen supporting plate 210 and the second screen supporting plate 220 form a flared structure. A flared opening of the flared structure faces to the base 410. In the process that the folding mechanism is folded, by accommodating the middle part of the flexible display screen 610 in the flared structure formed by the first screen supporting plate 210 and the second screen supporting plate 220, the folding extent of the middle part of the flexible display screen 610 can be relatively small, thus preventing creases from being formed on the display screen such as the flexible display screen 610 as much as possible, and improving the service life of the display screen.

Figure 1:
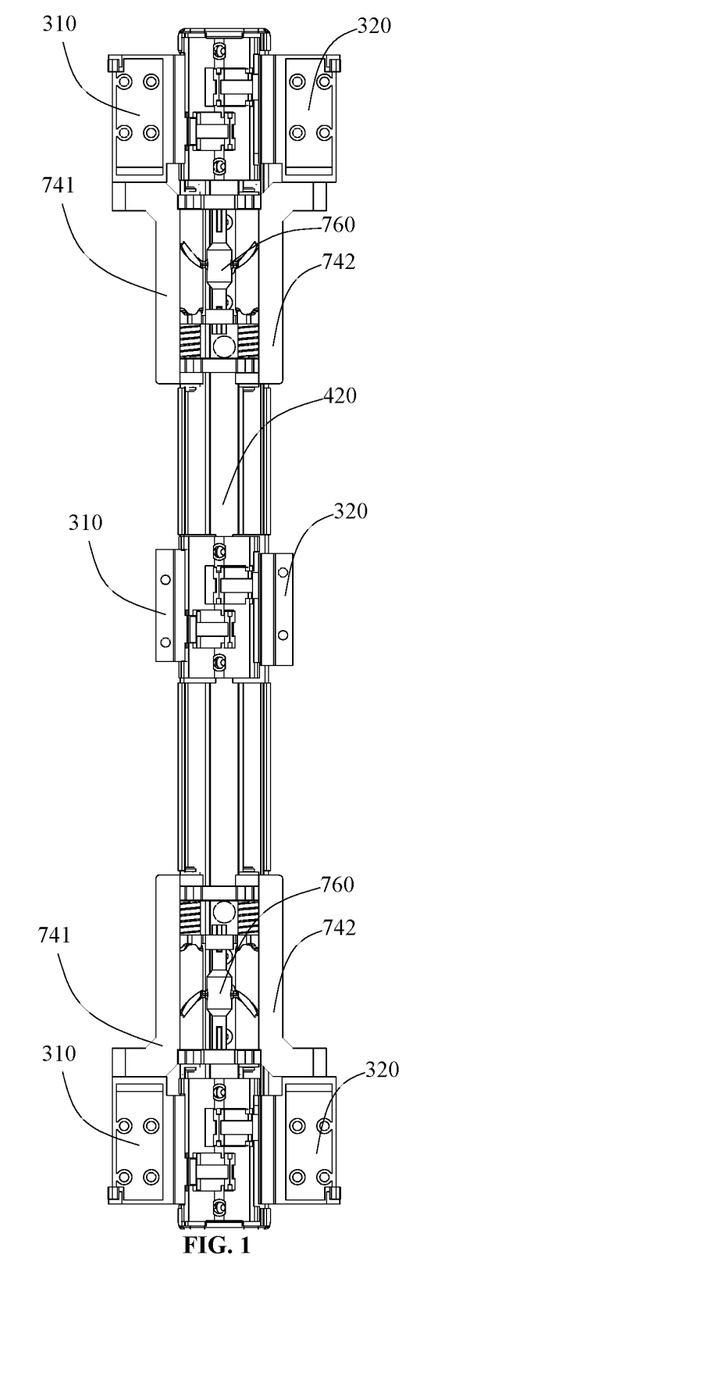
FIG. 1 illustrates a schematic diagram of a partial structure in a support structure according to an embodiment of this application.

Optionally, referring to FIG. 1 and FIG. 9, the folding mechanism further includes a cover body 420. The cover body 420 is fixedly connected to the side of the base 410 away from the first screen supporting plate 210. With the help of the cover body 420, a protection effect can be provided for the base 410. In addition, the cover body 420 can be used for covering the folding mechanism. Therefore, in a case that the folding mechanism is applied to an electronic device, the number of exposed components of the electronic device can be reduced as much as possible, thus improving the appearance performance of the electronic device on one hand, and improving the dust-proof and water-proof performance of the electronic device and reliability of the electronic device on the other hand. The cover body 420 may be fixed to the base 410 through bonding or the like. In another embodiment of this application, the base 410 and the cover body 420 may be detachably and fixedly connected together through threaded connectors such as screws, so as to improve the reliability of the connection between the two.

At the same time, in the folded state, a projection of the cover body 420 in a plane where the distribution direction of the first screen supporting plate 210 and the second screen supporting plate 220 and the direction of the rotation axis of the second rotating part 302 are located covers the first housing seat 310, the second housing seat 320 and the base 410, so as to ensure that the cover body 420 has a good covering effect. It is to be understood that, the distribution direction of the first screen supporting plate 210 and the second screen supporting plate 220 may be direction B in FIG. 8.

Specifically, the structure, size and mounting position of the cover body 420 may be designed according to the specific structure and parameters such as size of other components of the folding mechanism, so that when the folding mechanism is in the folded state and the folding mechanism is viewed from the side where the cover body 420 is located, the first housing seat 310, the second housing seat 320 and the base 410 of the folding mechanism can be covered by the cover body 420. More specifically, in order to improve the covering effect of the cover body 420 on other components, referring to FIG. 9, the cover body 420 may be an arc-shaped structural member as a whole, which can also improve the connection tightness between the cover body 420 and the first housing 110 and the second housing 120 of the support structure, and further improve the sealing performance of the support structure and the electronic device.

Further, referring to FIG. 3 to FIG. 7, the first housing seat 310 and/or the second housing seat 320 include an avoiding structure. The avoiding structure is provided with an avoiding groove 303. In the unfolded state, a side of the cover body 420 is accommodated in the avoiding groove 303. Specifically, the parameters such as position and size of the avoiding groove 303 may be flexibly determined according to the extension position and thickness of the cover body 420, which will not be limited here.

More specifically, both the first housing seat 310 and the second housing seat 320 are provided with avoiding grooves 303. In this case, with the help of the avoiding grooves 303, an avoiding space can be provided for the side of the cover body 420, so that the size that the two opposite sides of the cover body 420 along direction B in FIG. 8 can be extended in the direction of getting close to the first screen supporting plate 210 and the second screen supporting plate 220 is relatively larger, thus further improving the bending extent of the cover body 420. As a result, when the folding mechanism is in the folded state, gaps between the cover body 420 and the first housing 110 and the second housing 120 can be smaller, thus improving the reliability of the fit between the three.

Figure 5:
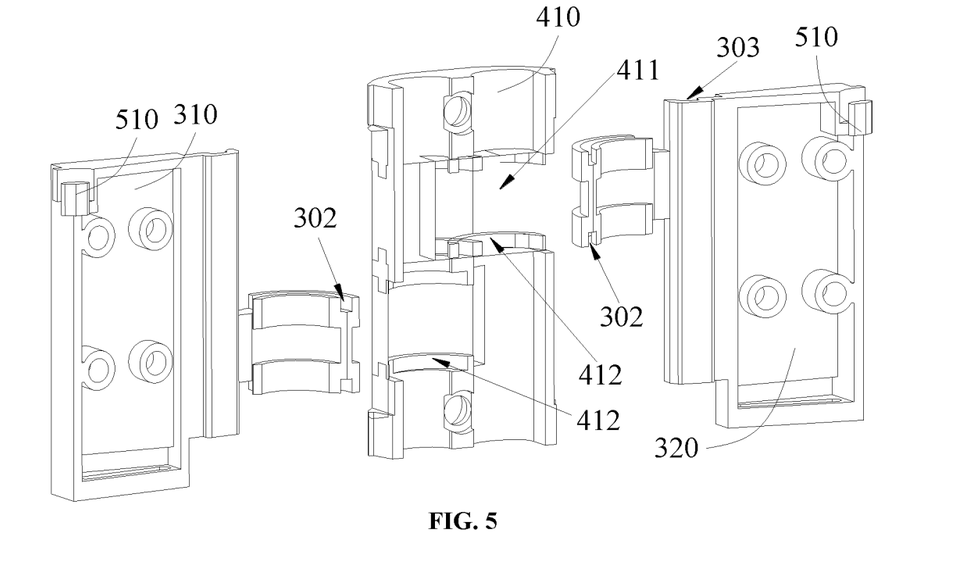
FIG. 5 illustrates an exploded schematic diagram of the structure illustrated in FIG. 4.

Taking the first housing seat 310 as an example, in a case that the first housing seat 310 is provided with the avoiding structure, in order to ensure that the structural strength of the first housing seat 310 can still meet the use requirements, referring to FIG. 4 and FIG. 5, the position where the avoiding structure is located may protrude towards the side away from the avoiding groove 303. Based on the above situation, further, the first screen supporting plate 210 may be provided with an accommodating sink, and in the folded state, at least a portion of the avoiding structure is accommodated in the accommodating sink, thus preventing the maximum angle of relative rotation between the first screen supporting plate 210 and the first housing seat 310 from being influenced by the avoiding structure provided on the first housing seat 310.

Specifically, the parameters such as position, width and depth of the accommodating sink may be flexibly determined according to the actual parameters of the avoiding structure, which will not be limited here. More specifically, the second housing seat 320 may also be provided with a corresponding avoiding structure, and the second screen supporting plate 220 may also be provided with a corresponding accommodating sink, so as to improve the symmetry of the folding mechanism and improve the overall performance of the folding mechanism.

Optionally, the first screen supporting plate 210 may be rotatably connected to the first housing 110 of the support structure. Moreover, as described above, the first housing seat 310 is fixedly connected to the first housing 110. In this case, the first screen supporting plate 210 can form a rotating fit relationship with the first housing seat 310. In order to facilitate mounting, referring to FIG. 4, in combination with FIG. 6, the folding mechanism may include a plurality of rotating assemblies. The first screen supporting plate 210 may be rotatably connected to the first housing seat 310 through the plurality of rotating assemblies. Under the action of the plurality of rotating assemblies, on the one hand, the stability of the rotating fit between the first screen supporting plate 210 and the first housing seat 310 can be improved; on the other hand, the optional types of the structure of the rotating assemblies can be widened, and the design and manufacturing difficulty can be reduced.

Referring to FIG. 4, in combination with FIG. 6, each rotating assembly specifically includes a third rotating part 510 and a fourth rotating part 520. One of the third rotating part 510 and the fourth rotating part 520 is connected to the first housing seat 310, and the other is connected to the first screen supporting plate 210. The third rotating part 510 includes an insertion block, the fourth rotating part 520 is provided with an insertion slot, the insertion block and the insertion slot are each provided with an arc-shaped fitting surface, and the insertion block and the insertion slot are in rotating fit through the arc-shaped fitting surfaces, thus ensuring a large rotating fit area between the third rotating part 510 and the fourth rotating part 520, and improving the reliability of the rotatable connection relationship between the two. Moreover, in a case that the above technical solution is adopted, by enabling the rotation axes of the third rotating part 510 and the fourth rotating part 520 to be located on the first screen supporting plate 210 or on the side of the first screen supporting plate 210 away from the first housing seat 310, the spacing between the first screen supporting plate 210 and the first housing seat 310 can be relatively smaller while ensuring that the rotating assembly is located on the side of the first screen supporting plate 210 facing to the first housing seat 310, thus further reducing the space occupied by the entire folding mechanism in the thickness direction of the base 410. Correspondingly, the second screen supporting plate 220 and the second housing seat 320 may also form a relatively stable rotatable connection relationship through the rotating assembly.

Specifically, by enabling the shape and size of the insertion block and the insertion slot to adapt to each other, it can be ensured that a rotating fit relationship can be formed between the two. Moreover, the insertion slot may be in a structure with two open sides, so that the insertion block can be mounted into the insertion slot from one side of the insertion slot. In addition, the maximum angle of relative rotation between the insertion block and the insertion slot can be limited through other structures such as the first housing seat 310 and the first housing 110. In addition, the relative position relationship between the first screen supporting plate 210 and the first housing seat 310 in the direction of the rotation axis of the second rotating part 302 may be limited by providing detachable limiting structures at two opposite ends of the first screen supporting plate 210 along the direction of the rotation axis of the second rotating part 302, so as to prevent relative movement of the two in the direction.

In another embodiment of this application, the fourth rotating part 520 includes a limiting member and a fitting member, the limiting member and the fitting member enclose to form the insertion slot, and the fitting member is provided with the arc-shaped fitting surface. On the direction of the rotation axis of the second rotating part 302, the respective limiting members of two fourth rotating parts 520 of the plurality of fourth rotating parts 520 are provided opposite to each other, and at least two third rotating parts 510 are provided between or outside the two opposite limiting members in a limiting manner. Referring to FIG. 6, the respective insertion slots of the two sets of fourth rotating parts 520 at two opposite ends of the first screen supporting plate 210 are provided outwards, that is, the insertion slots of the two sets of fourth rotating parts 520 are provided opposite to each other. In this case, referring to FIG. 4, the two sets of third rotating parts 510 in fit with the two sets of fourth rotating parts 520 are required to be respectively provided on the outer sides of the two sets of fourth rotating parts 520.

In a case that the above technical solution is adopted, with the help of the limiting members in the two fourth rotating parts 520, at least two third rotating parts 510 can be limited, so that the third rotating parts 510 and the fourth rotating parts 520 can form a limiting fit relationship in the direction of the rotation axes of the second rotating part 302, and the first screen supporting plate 210 and the first housing seat 310 form a stable fit relationship in the direction of the rotation axes of the second rotating parts 302.

In order to improve the stability of the folding mechanism, optionally, the number of the first housing seats 310 and/or the second housing seats 320 is more than one. Optionally, the number of the first housing seats 310 is the same as the number of the second housing seats 320, which is more than one. By providing the plurality of first housing seats 310 and the plurality of second housing seats 320 in sets, the stability of action between the first housing 110 and the second housing 120 can be further improved. As described above, the first housing seat 310 may be rotatably connected to the first screen supporting plate 210, and the second housing seat 320 may be rotatably connected to the second screen supporting plate 220. In a case that the number of the first housing seats 310 and second housing seats 320 is more than one, at least one first housing seat 310 may be rotatably connected to the first screen supporting plate 210, and at least one second housing seat 320 may be connected to the second screen supporting plate 220. More specifically, referring to FIG. 1 and FIG. 6, the first housing seats 310 located at two opposite ends of the base 410 may be rotatably connected to the first screen supporting plate 210 through the rotating assemblies, and the other first housing seats 310 may no longer be connected to the first screen supporting plate 210, thus ensuring high rotating fit stability between the first housing seats 310 and the first screen supporting plate 210, and reducing the difficulty in fabricating and assembling the entire folding mechanism. Correspondingly, the second housing seats 320 may be provided in the same way, which will not be repeated here for the sake of simplicity.

Optionally, referring to FIG. 6, the folding mechanism may further include a third screen supporting plate 230, the third screen supporting plate 230 is provided opposite to the synchronization assembly, and the side of the first screen supporting plate 210 facing to the second screen supporting plate 220 and the side of the second screen supporting plate 220 facing to the first screen supporting plate 210 are each provided with an avoiding gap. In the unfolded state, the third screen supporting plate 230 is accommodated in two avoiding gaps, and the first surface of the third screen supporting plate 230 away from the base 410 is in flush with the first surface of the first screen supporting plate.

Specifically, the shape and size of the avoiding gaps may be designed corresponding to the shape and size of the third screen supporting plate 230. By providing the third screen supporting plate 230 at the position where the synchronization assembly is located, the first screen supporting plate 210 and the second screen supporting plate 220 can avoid the synchronization assembly through the respective avoiding gaps in the process of rotation relative to the base 410. In this case, referring to FIG. 8, under the situation that the spacing between the first screen supporting plate 210 and the second screen supporting plate 220 remains unchanged, the spacing between the first screen supporting plate 210 and the second screen supporting plate 220 and the base 410 can be further reduced, thus reducing the overall thickness of the folding mechanism and reducing the overall thickness of the electronic device using the folding mechanism. Of course, it is to be understood that, for the positions where the first screen supporting plate 210 and the second screen supporting plate 220 are in fit with the first housing seat 310 and the second housing seat 320 on the base 410, it may be correspondingly designed according to the actual situation to ensure that the positions in fit with the first housing seat 310 and the second housing seat 320 on the base 410 do not obstruct the relative rotation of the first screen supporting plate 210 and the second screen supporting plate 320.

Optionally, the third screen supporting plate 230 may be fixed on the base 410. In another embodiment of this application, the third screen supporting plate 230 may be movably connected to the base 410 along its own thickness direction. Specifically, the third screen supporting plate 230 may be movably mounted on the base 410 through a pin, so that the third screen supporting plate 230 can move relative to the base 410 in the working process of the folding mechanism.

Based on the above situation, in the unfolded state, the spacing between the third screen supporting plate 230 and the base 410 along its own thickness direction is first spacing. In the folded state, the spacing between the third screen supporting plate 230 and the base 410 along its own thickness direction is second spacing. The second spacing is smaller than the first spacing. Simply speaking, in the process that the folding mechanism switches from the unfolded state to the folded state, the third screen supporting plate 230 moves in a direction of getting close to the base 410. In the process that the folding mechanism switches from the folded state to the unfolded state, the third screen supporting plate 230 moves in a direction of getting away from the base 410. By adopting the above technical solution, the accommodating space of the folding mechanism in the folded state can be further expanded, thus further preventing the problem of creases caused by the folding of the flexible display screen.

In addition, an elastic member or the like may be provided between the third screen supporting plate 230 and the base 410, so that in the folding process of the flexible display screen, the flexible display screen can squeeze the third screen supporting plate 230 to move in the direction of getting close to the base 410, and in the gradual unfolding process of the flexible display screen, the elastic member can drive the third screen supporting plate 230 to reset through its own elastic force. Alternatively, a power driving member or other means may be provided between the third screen supporting plate 230 and the base 410. The power driving member can drive the third screen supporting plate 230 and the base 410 to move in a direction of getting close to each other or getting away from each other.

In addition, as described above, the first screen supporting plate 210 and the first housing seat 310 can move relative to each other in the process that the first screen supporting plate 210 rotates with the first housing seat 310 relative to the base 410. More specifically, in the process that the first screen supporting plate 210 rotates in the direction of getting close to the first housing seat 310, the driving force may be increased by the flexible display screen of the electronic device. For the process that the first screen supporting plate 210 rotates in the direction of getting away from the first housing seat 310, by providing structures such as the elastic member in the folding mechanism, with the help of the elastic resetting force, the first screen supporting plate 210 may be driven, so that when the first housing seat 310 and the second housing seat 320 rotate to the unfolded state, the first screen supporting plate 210 can be in flush with the screen supporting surface of the first housing 110, so as to jointly provide support for the flexible display screen. In another embodiment of this application, a power driving device, such as a motor, may be further provided between the first screen supporting plate 210 and the first housing 110. The power driving device can drive the first screen supporting plate 210 and the first housing seat 310 to rotate in a direction of getting close to each other or getting away from each other. Of course, the second housing seat 320 and the second screen supporting plate 220 may be designed and manufactured with reference to any of the above technical solutions.

Based on the above embodiment, optionally, referring to FIG. 8 and FIG. 9, the sides of the first screen supporting plate 210 and the second screen supporting plate 220 close to the third screen supporting plate 230 are each provided with a first overlapping edge, and two opposite sides of the third screen supporting plate 230 are each provided with a second overlapping edge. In the unfolded state, each second overlapping edge is overlapped on the corresponding first overlapping edge. Specifically, the shape and size of the first overlapping edge and the second overlapping edge may adapt to each other. Specifically, both the first overlapping edge and the second overlapping edge may be stepped structural members, so as to improve the overlapping stability of the third screen supporting plate 230 on the first screen supporting plate 210 and the second screen supporting plate 220.

In a case that the above technical solution is adopted, in the unfolded state, the third screen supporting plate 230 may be overlapped on the first screen supporting plate 210 and the second screen supporting plate 220. In this case, the first screen supporting plate 210 and the second screen supporting plate 220 can provide driving force for the movement of the third screen supporting plate 230 relative to the base 410. Therefore, with the movement of the folding mechanism, in a case that the first screen supporting plate 210 and the second screen supporting plate 220 can automatically rotate, there is no need to provide the driving member for the third screen supporting plate 230, thus on the one hand, reducing the number of components of the folding mechanism, and on the other hand, improving the assembling efficiency of the folding mechanism and reducing the production cost.

In order to improve the structural compactness of the entire folding mechanism, referring to FIG. 4 and FIG. 5, the base 410 may be provided with an accommodating groove 411. A first rotating part 412 may be provided in the accommodating groove 411. By accommodating at least a portion of the second rotating part 302 of the first housing seat 310 and at least a portion of the second rotating part 302 of the second housing seat 320 in the accommodating groove 411, the space occupied by the folding mechanism in the thickness direction of the base 410 can be reduced, thus reducing the thickness of the entire electronic device and improving the overall performance of the product. It is to be understood that, the thickness direction of the base 410 may be specifically perpendicular to direction A in FIG. 4 and direction B in FIG. 8.

Specifically, by expanding the size of the accommodating groove 411, a plurality of first rotating parts 412 can be provided in one accommodating groove 411. In another embodiment of this application, in order to improve the fitting stability between the first housing seat 310 and the second housing seat 320 and the base 410, and prevent mutual interference between the first housing seat 310 and the second housing seat 320, a plurality of accommodating grooves 411 may be provided corresponding to the number of the first rotating parts 412. Of course, in order to ensure that at least a portion of the second rotating part 302 accommodated in the accommodating groove 411 can be in properly fit with the first rotating part 412, the specific structure of the first rotating part 412 and the second rotating part 302 may adapt to the structure and size of the accommodating groove 411 in the design and fabrication process.

Further, in order to maximize the reliability of the rotating fit relationship between the first rotating part 412 and the second rotating part 302 located in the accommodating groove 411, optionally, referring to FIG. 4 and FIG. 5, one of the first rotating part 412 and the second rotating part 302 includes a sliding block, the other is provided with a sliding groove, and the sliding groove is in sliding fit with the sliding block. The fitting area between the sliding groove and the sliding block is relatively large. In addition, the utilization of the space in the accommodating groove 411 can be maximized. Of course, both the sliding groove and the sliding block are in an arc-shaped structure, so as to ensure that both the first housing seat 310 and the second housing seat 320 can form a rotating fit relationship with the help of the sliding groove and the sliding block in sliding fit.

In order to further improve the stability of the rotating fit relationship between the first housing seat 310 and the second housing seat 320 and the base 410, referring to FIG. 5, two opposite sides of the accommodating groove 411 are provided with the first rotating parts 412. Correspondingly, two opposite sides of the first housing seat 310 and the second housing seat 320 are provided with the second rotating parts 302. Taking the first housing seat 310 as an example, in a case that the two second rotating parts 302 on the opposite sides are correspondingly in fit with the two first rotating parts 412 in the accommodating groove 411 one to one, the situation that the first housing seat 310 deviates from its own rotation axis and rotates relative to the base 410 can be avoided, thus improving the stability of the rotating fit relationship between the first housing seat 310 and the base 410. Correspondingly, in a case that the above technical solution is adopted, the rotating fit relationship between the second housing seat 320 and the base 410 is also relatively more stable.

In a case that the first rotating part 412 is provided in the accommodating groove 411, in order to minimize the width of the base 410 (i.e., the size of the base 410 along direction B in FIG. 8) while ensuring a good rotating fit relationship between the first rotating part 412 and the second rotating part 302, optionally, the plurality of first rotating parts 412 may be provided spaced apart or misaligned from each other in the direction of the rotation axis of the second rotating part 302. That is to say, the plurality of first rotating parts 412 may be distributed along the direction of the rotation axis of the second rotating part 302, and there is spacing with a predetermined size between any two adjacent first rotating parts 412. Alternatively, in a case that the plurality of first rotating parts 412 are distributed along the direction of the rotation axis of the second rotating part 302, the plurality of first rotating parts 412 may be grouped in pairs. Two first rotating parts 412 in any group are provided adjacent to each other on the direction of the rotation axis of the second rotating part 302, that is, there is no spacing between the two first rotating parts 412 in a group on the direction of the rotation axis of the second rotating part 302. By adopting this technical solution, on the one hand, the above technical purpose can also be achieved. On the other hand, since the positions of the two first rotating parts 412 in the group are close to each other, by enabling the two first rotating parts 412 in any group to be correspondingly in fit with the first housing seat 310 and the second housing seat 320 respectively, the symmetry between the first housing seat 310 and the second housing seat 320 can also be improved to a certain extent, thus improving the overall performance of the folding mechanism.

Further, as described above, the folding mechanism can be applied to the support structure. Based on this, an embodiment of this application further provides a support structure. The support structure includes a first housing 110 and a second housing 120. In the process of assembling the support structure, the first housing seat 310 is fixedly connected to the first housing 110, and the second housing seat 320 is fixedly connected to the second housing 120. In the process of unfolding and folding the support structure, the first housing 110 and the second housing 120 can respectively drive the first housing seat 310 and the second housing seat 320 to move relative to each other, thus causing the first housing seat 310 and the second housing seat 320 to rotate relative to each other.

Specifically, the first housing seat 310 and the first housing 110 may be fixed to each other through bonding, riveting, clamping, or threaded connection. In order to improve the connection reliability and reduce the difficulty in disassembling and assembling, a run-through hole or threaded hole may be formed in the first housing seat 310 and the first housing 110, so that the first housing seat 310 and the first housing 110 can be fixedly connected through a threaded connector. Correspondingly, the second housing seat 320 and the second housing 120 may also be fixed to each other through a threaded connector.

In addition, as described above, the first screen supporting plate 210 and the first housing seat 310 can rotate relative to each other. Therefore, in order to prevent the first housing 110 and the first housing seat 310 from obstructing the rotation of the first screen supporting plate 210, optionally, the sides of the first housing 110 and the first housing seat 310 facing to the first screen supporting plate 210 are each provided with an inclined avoidance supporting surface. In this case, on the one hand, it can ensure that the first screen supporting plate 210 has the ability to rotate relative to the first housing seat 310 (and the first housing 110), and on the other hand, the inclined avoidance supporting surface can also provide a good support effect for the first screen supporting surface, thus ensuring that the flexible display screen can be well supported.

Correspondingly, in a case that the second screen supporting plate 220 is in rotating fit with the second housing seat 320, the sides of the second housing 120 and the second housing seat 320 facing to the second screen supporting plate 220 can also be correspondingly provided with an inclined avoidance supporting surface, so that in the folded state, the first screen supporting plate 210 and the second screen supporting plate 220 can be supported on the corresponding inclined avoidance supporting surfaces, thus improving the stability of the folding mechanism.

Based on the support structure provided in the above embodiment, further, an embodiment of this application further provides an electronic device. The electronic device includes a first display module and the support structure. The first display module includes a flexible display screen 610. The first display screen 610 is mounted on the support structure. In addition, the first display screen 610 can be supported on the first housing 110, the second housing 120, the first screen supporting plate 210 and the second screen supporting plate 220, so that the support structure can provide a good supporting effect for the flexible display screen 610 of the first display module.

Moreover, the electronic device has a folded state and an unfolded state. In addition, in the folded state, the spacing between the respective first sides 203 of the first screen supporting plate 210 and the second screen supporting plate 220 is greater than the spacing between the respective second sides of the first screen supporting plate 210 and the second screen supporting plate 220, so that the electronic device can provide a large flared accommodating space for the middle part of its flexible display screen 610, so as to prevent creases from being formed in the middle part of the flexible display screen 610 in the folding process, thus improving its service life.

In order to further improve the usability of the electronic device, optionally the side of the first housing 110 away from the first display module is provided with a second display module. The parameters such as size of the second display module may be determined according to the actual situation. In a case that the above technical solution is adopted, the two opposite sides of the first housing 110 are provided with display modules. By enabling the electronic device to be in the folded state, on the one hand, it is convenient for the user to carry it, and the user can use the second display module for man-machine interaction; on the other hand, in a case that the user has a need to browse videos or the like, the user can unfold the electronic device and use the larger first display module to improve the audio-visual experience. Of course, the above scenario is only exemplary. In a case that the software and other conditions are met, the user may use both the first display module and the second display module at the same time. In other words, during the use of the electronic device, the user may flexibly choose to use the first display module and/or the second display module according to the needs, which will not be limited here.

The electronic device disclosed in this embodiment of this application may be a smart phone, a tablet computer, an e-book reader or a wearable device. Of course, the electronic device may also be other devices, which is not limited in this embodiment of this application.

What are emphatically described in the embodiments of this application are the differences between the embodiments. As long as the different optimized features between the embodiments are not contradictory, they may be combined to form a better embodiment, which will not be repeated here for the sake of simplicity.

The foregoing descriptions are merely embodiments of this specification and are not intended to limit this application. For a person skilled in the art, various modifications and variations can be made to this application. Any modification, equivalent replacement, or improvement made without departing from the spirit and principle of this application shall fall within the scope of the claims of this application.

The invention claimed is:

1. A folding mechanism, comprising a first screen supporting plate, a second screen supporting plate, a first housing seat, a second housing seat, a base and a synchronization assembly,
   the first housing seat being provided on the first screen supporting plate, and the second housing seat being provided on the second screen supporting plate;
   the base being provided with a plurality of first rotating parts, both the first housing seat and the second housing seat being correspondingly and rotatably connected to the plurality of first rotating parts one to one through respective second rotating parts, and the folding mechanism having an unfolded state and a folded state; and
   the synchronization assembly comprising a first connecting shaft, a second connecting shaft, a first synchronization swing arm, a second synchronization swing arm and a synchronization connector,
   the first synchronization swing arm being in limiting fit with the first connecting shaft in a rotation direction of the second rotating part, and the first synchronization swing arm being in fit with the first housing seat;
   the second synchronization swing arm being in limiting fit with the second connecting shaft in a rotation direction of the second rotating part, and the second synchronization swing arm being in fit with the second housing seat; and
   the first synchronization swing arm being provided with a first sliding groove extending spirally, the second synchronization swing arm being provided with a second sliding groove extending spirally, the synchronization connector being provided with a first sliding block and a second sliding block, the first sliding block being in sliding fit with the first sliding groove, the second sliding block being in fit with the second sliding groove, and the first housing seat and the second housing seat synchronously rotating through the synchronization assembly.

2. The folding mechanism according to claim 1, wherein the synchronization assembly further comprises a limiting seat, the limiting seat is fixed to the base, the limiting seat is provided with a limiting hole, one end of the synchronization connector extends into the limiting hole, and the synchronization connector is in limiting fit with the limiting seat in the rotation direction of the second rotating part.

3. The folding mechanism according to claim 2, wherein two opposite ends of the synchronization connector are provided with the limiting seats, each limiting seat is provided with two fitting holes, one ends of the first connecting shaft and the second connecting shaft are correspondingly in insertion fit with the two fitting holes of one limiting seat, and the first connecting shaft and the second connecting shaft are in limiting fit with two limiting seats in the direction of an rotation axis of the second rotating part.

4. The folding mechanism according to claim 1, wherein the first synchronization swing arm is provided with a first cam sleeve, the first cam sleeve is provided with the first sliding groove, the folding mechanism further comprises a second cam sleeve and an elastic member, the first connecting shaft is provided with the first cam sleeve and the second cam sleeve in a sleeving manner, the second cam sleeve is in rotating fit with the first connecting shaft in the rotation direction of the second rotating part, and the elastic member is in a stretched state and a compressed state in a case that the first cam sleeve and the second cam sleeve rotate relative to each other.

5. The folding mechanism according to claim 4, wherein the folding mechanism further comprises two limiting seats opposite and fixed along the direction of the rotation axis of the second rotating part, the first cam sleeve, the second cam sleeve and the elastic member are all provided between the two limiting seats, and the elastic member is provided on the side of the second cam sleeve away from the first cam sleeve.

6. The folding mechanism according to claim 4, wherein the second synchronization swing arm is provided with a third cam sleeve, the third cam sleeve is provided with the second sliding groove, and both the first cam sleeve and the third cam sleeve are correspondingly provided with the second cam sleeve and the elastic member.

7. The folding mechanism according to claim 1, wherein the first screen supporting plate is in rotating fit with the first housing seat, and the second screen supporting plate is in rotating fit with the second housing seat;
   in the unfolded state, respective first sides of the first screen supporting plate and the second screen supporting plate are located between respective second sides, and respective first surfaces of the first screen supporting plate and the second screen supporting plate away from the base are provided in flush with each other; and
   in the folded state, the spacing between the respective first sides of the first screen supporting plate and the second screen supporting plate is greater than the spacing between the respective second sides of the first screen supporting plate and the second screen supporting plate.

8. The folding mechanism according to claim 7, wherein the folding mechanism further comprises a cover body, the cover body is fixedly connected to the side of the base away from the first screen supporting plate, and in the folded state, a projection of the cover body in a plane where the rotation direction of the second rotating part is located covers the first housing seat, the second housing seat and the base.

9. The folding mechanism according to claim 8, wherein the first housing seat and/or the second housing seat comprise an avoiding structure, the avoiding structure is provided with an avoiding groove, and in the unfolded state, a side of the cover body is accommodated in the avoiding groove.

10. The folding mechanism according to claim 9, wherein the first screen supporting plate and/or the second screen supporting plate are provided with an accommodating sink, and in the folded state, and at least a portion of the avoiding structure is accommodated in the accommodating sink.

11. The folding mechanism according to claim 7, wherein the folding mechanism comprises rotating assemblies, the first screen supporting plate is rotatably connected to the first housing seat through a plurality of rotating assemblies, each rotating assembly comprises a third rotating part and a fourth rotating part, one of the third rotating part and the fourth rotating part is connected to the first housing seat, the other is connected to the first screen supporting plate, the third rotating part comprises an insertion block, the fourth rotating part is provided with an insertion slot, the insertion block and the insertion slot are each provided with an arc-shaped fitting surface, and the insertion block and the insertion slot are in rotating fit through the arc-shaped fitting surfaces.

12. The folding mechanism according to claim 11, wherein the fourth rotating part comprises a limiting member and a fitting member, the limiting member and the fitting member enclose to form the insertion slot, and the fitting member is provided with the arc-shaped fitting surface; and
in a direction where the rotation axis of the second rotating part is located, the respective limiting members of two fourth rotating parts of the plurality of fourth rotating parts are provided opposite to each other, and the plurality of third rotating parts are provided between the two limiting members in a limiting manner.

13. The folding mechanism according to claim 7, wherein the number of the first housing seats and/or the second housing seats is more than one, at least one of the first housing seats is rotatably connected to the first screen supporting plate, and at least one of the second housing seats is rotatably connected to the second screen supporting plate.

14. The folding mechanism according to claim 7, wherein the folding mechanism further comprises a third screen supporting plate, the third screen supporting plate is provided opposite to the synchronization assembly, and the side of the first screen supporting plate facing to the second screen supporting plate and the side of the second screen supporting plate facing to the first screen supporting plate are each provided with an avoiding gap; and
in the unfolded state, the third screen supporting plate is accommodated in two avoiding gaps, and a first surface of the third screen supporting plate away from the base is in flush with the first surface of the first screen supporting plate.

15. The folding mechanism according to claim 1, wherein the base is provided with an accommodating groove, the first rotating part is provided in the accommodating groove, and at least a portion of the second rotating parts of the first housing seat and the second housing seat is accommodated in the accommodating groove.

16. The folding mechanism according to claim 15, wherein one of the first rotating part and the second rotating part comprises a sliding block, the other is provided with a sliding groove, and the sliding groove is in sliding fit with the sliding block.

17. The folding mechanism according to claim 16, wherein two opposite sides of the accommodating groove are provided with the first rotating parts, and two opposite sides of the first housing seat and the second housing seat are provided with the second rotating parts.

18. The folding mechanism according to claim 1, wherein the plurality of first rotating parts are provided spaced apart or misaligned from each other in a direction where the rotation axis of the second rotating part is located.

19. A support structure, comprising a first housing, a second housing and the folding mechanism according to claim 1, the first housing seat being fixedly connected to the first housing, and the second housing seat being fixedly connected to the second housing.

20. An electronic device, comprising a first display module and the support structure according to claim 19, the first display module comprising a flexible display screen, the first display module being mounted on the support structure, and the first display module being supported on the first housing, the second housing, the first screen supporting plate and the second screen supporting plate.

* * * * *